United States Patent Office 3,396,352
Patented Aug. 6, 1968

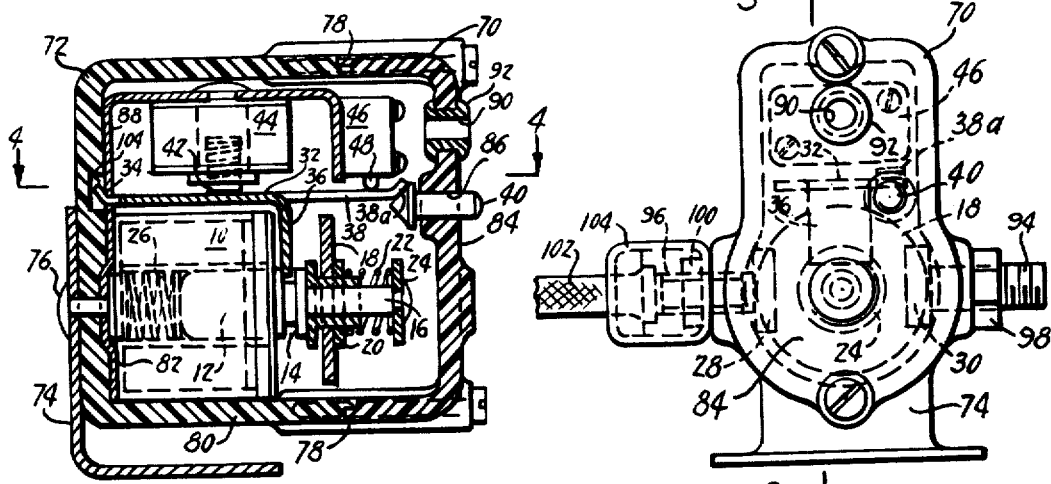
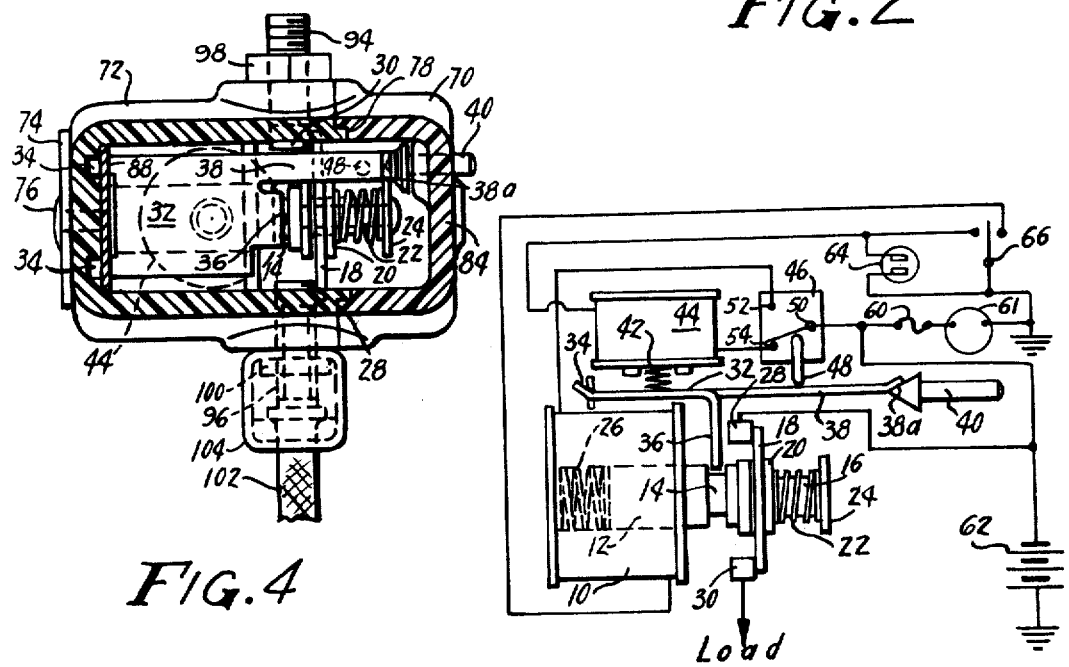
Fig. 1, Fig. 2, Fig. 3, Fig. 4
INVENTOR.
REGINALD D. WILSON
BY
ATTORNEYS.

3,396,352
SAFETY SWITCH FOR VEHICLES
Reginald D. Wilson, Baltimore, Md., assignor to The Wilson Switch Company, Baltimore, Md., a corporation of Maryland
Filed Oct. 6, 1966, Ser. No. 584,811
9 Claims. (Cl. 335—170)

ABSTRACT OF THE DISCLOSURE

An emergency electric relay switch for controlling the circuitry of an automotive vehicle and including a pair of normally de-energized solenoids each having an armature, releasable means connecting said armatures against movement, and switch means on one of the armatures normally closing one of said circuits; a single pole single throw switch connected in the circuit of each solenoid and operable to alternately energize and de-energize said solenoids to effect the release and connection of the armatures and the attendant opening and closing, respectively, of each said switch means; and, an overriding manually operable switch reset means connected to said single pole double throw switch to actuate and reset said last-named switch.

---

This invention relates to a latching relay switch for use in vehicles to deenergize the electrical system of such vehicles in emergency situations and is an improvement of my Emergency Switch disclosed in U.S. Patent No. 3,229,109 issued Jan. 11, 1966.

Without intending the limit the scope of the invention which is defined in the appended claims, this inventon relates basically to a latching relay switch in which a housing has mounted therein adjacent the base and back walls a relay solenoid with its axis substantially parallel to the base or bottom of the housing, an armature having an indent therein slidably mounted for movement in the relay solenoid with a compact closing bridging element carried thereon, and a latching relay having the latching solenoid mounted above with its axis substantially perpendicular to the axis of the relay solenoid and a latching armature for selectively engaging the indent on the relay armature and including manual means for operating the latching armature.

Emergency switches are known in the prior art and are described in my previous patent referred to above for deactuating the electrical systems of automobiles if the automobiles should be involved in an accident to prevent fire, to turn the engine off automatically, and to prevent additional damage. Such emergency circuits may also be manually operated to deactuate the electrical system of an automobile in the event of an attempted holdup or theft. The relay of my previous patent operates in a manner similar to that described and claimed herein, the present invention comprising an improvement of the relay of my previous patent.

It is, therefore, an object of this invention to provide an improved compact latching switch for emergency use in vehicles.

An additional object of this invention is the provision of a highly compact, rugged, dependable production model latching relay for emergency use in vehicles.

An additional object of this invention is the provision of a manual reset included in the latching relay housing.

Other objects of the invention will appear from the following specification and from the drawings to which reference is now made.

In the drawings:
FIGURE 1 is an overall view in partial schematic of the latching relay safety switch of this invention showing the circuit interconnection with elements external to the safety switch;

FIGURE 2 is a front view of the safety switch of this invention showing the housing and the positional relationship of the components therein;

FIGURE 3 is a side view in partial cross section taken substantially along line 3—3 of FIGURE 2 looking in the direction of the arrows and showing the internal arrangements of the components of the safety switch of this invention; and FIGURE 4 is a top view of the safety switch of this invention taken substantially along line 4—4 of FIGURE 3 looking in the direction of the arrows and shown in partial cross section.

FIGURE 1 best shows the operative relationship of the components of the safety switch of this invention. The operative components include a relay solenoid 10, a relay armature 12 which is slidably mounted at one end for reciprocable movement in solenoid 10 and has an indent 14 in an exterior portion of the solenoid 12 and an end portion 16. In a preferred embodiment the end portion may be reduced in size as shown in FIGURE 1. A conductive bridging disc 18 is carried by insulating washer 20, insulating washer 20 being slidably mounted on the reduced end portion 16 of armature 12. A compression spring 22 which is secured at one end to the armature 16 by a keeper 24 biases the insulating washer 20 toward the solenoid and away from the exterior end of the armature 12. In the preferred embodiment, a compression spring 26 may be provided in the armature for biasing the entire armature outwardly away from the solenoid. Contacts 28 and 30 are mounted adjacent the armature 12 for being electrically closed by the bridging disc 18 when the armature is moved toward the solenoid 10 by actuation of the solenoid as will be described hereinafter.

The bridging disc 18 may be held in the closed position even when solenoid 10 is deactuated by a latching armature 32 which is pivotally mounted at 34 and includes a finger extension 36 which extends substantially perpendicularly on the longitudinal axis of latching armature 32 for engaging the indent 14 on relay 12. The latching armature 32 also includes an extension 38 which extends in the direction of the longitudinal axis of the latching armature 32 and which may include a partially turned up end portion 38a. A manual reset member, pin 40, which, in the preferred embodiment, has an enlarged portion on the inner end thereof tapering to a pointed inner end, is provided for manually pivoting the latching armature 32 upwardly to release the relay armature 12 for movement to permit the opening of the bridging member 18 with contacts 28 and 30.

An important feature of this invention is the relation of the pointed inner end of the manual reset pin 40 and the partially turned up end 38a of the latching armature 32. The partially turned up end 38a of the latching armature 32 slidably engages the tapered end of pin 40 thus biasing the pin outwardly away from the end of the extension 38 permitting downward movement of the latching armature following manual reset.

The latching armature is biased downwardly by a spring 42 which is in compression between the latching armature and the latching solenoid 44 which may electrically pivotally move the latching armature 32 to release relay armature 12 for movement outwardly and away from the relay solenoid 10.

A microswitch 46 is mounted adjacent the latching relay extension 38 and includes an operator 48. The microswitch also includes an input terminal 50 and output terminals 52 and 54. A microswitch of this type is shown in U.S. Patent No. 2,854,540 to L. L. Cunningham, issued Sept. 30, 1958.

While the interconnection of the safety switch of this invention is similar to that described in my previous patent, the disclosure of which is incorporated herein by reference, and operates in a similar manner, the interconnection with the external components of the system is shown in simplified schematic FIGURE 1.

In a highly desirable and useful application, the safety switch described herein is interconnected with a number of associated components to provide a complete operative circuit. Those components which may be located exteriorly of the housing, which is described more fully hereinafter, will desirably include a fuse 60 and a clock 61 which are connected in a complete circuit from a source of electrical energy, such as battery 62, and which are uneffected by the condition of actuation of the safety switch of this invention. Other exteriorly located components may include a tilting switch 64, which may be of the type described in my previous patent, and a reset switch 66.

In the preferred embodiment, the relay solenoid 10, the latching solenoid 44, microswitch 46 and contact 28 are interconnected by circuit means located inside the housing. This interconnection is shown in FIGURE 1. Input terminal 50 of microswitch 46 is connected directly to contact 28. Means are provided for connecting input terminal 50 and contact 28 to battery 62 and to fuse 60, both of which are located exteriorly of the housing of the safety switch of this invention. Output terminal 52 of microswitch 46 is connected to relay solenoid 10 on one side of the solenoid and solenoid 10 is provided at the other side with means for connecting it to one pole of switch 66. Output terminal 54 of microswitch 46 is connected to one side of latching solenoid 44 while the other side of latching solenoid 44 is provided with means for connecting it to tilting switch 64 and to the other pole of switch 66, as shown in FIGURE 1. It will be apparent from the diagram that clock 61 will be maintained in operation regardless of the actuation of the safety switch as described in this invention. Of course other circuit arrangements may be highly desirable and are deemed to be included within the inventive concept wherein the safety switch of this invention is involved.

The operation of the safety switch of this invention and the associated circuitry is similar to that described in my previous patent. As illustrated in FIGURE 1, armature 12 is engaged in indent 14 by finger 36 to hold the bridging disc 18 in physical and electrical contact with contacts 28 and 30, thereby supplying electric energy to the load in the vehicle, except for the clock 61 which is connected separately as previously described. In the event of an accident tilting switch 64 would close thereby completing a circuit from battery 62 through input terminal 50 to output terminal 54 of microswitch 46 and through latching solenoid 44 to the other side of battery 62 through ground. A similar circuit may optionally be completed through one pole of switch 66 if desired. The energization of latching solenoid 44 actuates latching armature 32 to release relay armature 12 for movement in response to compression bias spring 26 to open the circuit between contacts 28 and 30. A similar result may be obtained by mechanically lifting latching armature 32 by pushing manual reset 40 to lift latching solenoid 32. When latching solenoid 32 is lifted, a path is completed from input terminal 50 to output terminal 52 of switch 46 thereby permitting reenergization of the relay solenoid 10 to again provide electric energy to the vehicle load systems.

The operative components of the safety switch are, in the preferred embodiment, enclosed in housing shown in FIGURES 2 to 4 to which reference is now made. With reference particularly to FIGURES 3 and 4, the housing comprises a front portion 70 and a back portion 72 to which mounting bracket 74 is connected by a rivet 76, front portion 70 and back portion 72 are joined in an overlapping flange joint 78. The housing enclosure has a bottom wall 80, a back wall 82, and a front wall 84. The manual reset pin is slidably received in an aperture 86. In a preferred embodiment the slidable reset pin is of a self-lubricating insulating material. The relay solenoid 10 is mounted adjacent the bottom and back walls with its axis parallel to the bottom wall. Mounted coaxially in the solenoid for reciprocal movement is armature 12. In a preferred embodiment, a support bracket 88 extends from the bottom of the housing enclosure up the back wall and across the top and provides support for the relay solenoid 10, latching solenoid 44 and microswitch 46, as best shown in FIGURE 3. It will be noted that latching solenoid is mounted adjacent the top side of the housing enclosure with its axis substantially perpendicular to the axis of the relay solenoid 10. An aperture 90 with a grommet 92 is provided in the front wall for interconnection with the circuit system as described with reference to FIGURE 1.

Contacts 28 and 30 are mounted in the housing by bolts 94 and 96 which extend through apertures in the side walls of the housing enclosure. A lock nut 98 secures bolt 94 and contact 30 in place while a lock nut 100 secures contact 28 and bolt 96 in place, as best shown in FIGURES 2 and 4. A lead-in wire 102 from the source of electric energy is connected to bolt 96 in a dust cover 104. A similar connection may also be made to bolt 94.

In a preferred embodiment, the housing may be constructed of an insulating material such as a cast polyester or Bakelite. A back portion of the housing enclosure 72 includes a recess 104 which permits the pivotal mounting 34 between bracket 88 and latching armature 32.

It will be seen from inspection of the figures that a highly compact and rugged safety switch including a contact closing relay and a latching relay with manual means for actuating the latching armature has been provided. The safety switch of this invention is thus lighter and more compact than those of the prior art, is more dependable and longer lasting in operation and thus requires less maintenance. For this reason, the safety switch may be mounted on the vehicle in a relatively inexcessible position since it is unlikely that it will ever be necessary to reach the safety switch for service.

While this invention has been described with relation to a highly specific embodiment which has proved most highly successful in testing, it will be realized that variations in the specific structures may be made without departing from the spirit of the invention. With due consideration being given to the exemplary nature of the drawings and the description thereof, the scope of the invention is defined in the appended claims.

I claim:
1. A safety switch for use in vehicles comprising:
   a switch housing composed of insulating material having front, back, top, bottom and side walls, said side walls and front wall having at least one aperture therein;
   a relay solenoid mounted in the housing adjacent the bottom and back walls with the axis thereof substantially parallel to the bottom wall;
   an armature slidably mounted in the solenoid, said solenoid having an indent therein exteriorly of the solenoid;
   a compression spring in the solenoid resiliently biasing the armature away from the backwall outwardly from the solenoid;
   an insulating washer slidably received on the armature between the indent therein and the exterior end thereof;
   a compression spring received about the armature between the insulating washer and the end of the armature resiliently biasing the insulating washer away from the end of the armature;
   a keeper on the armature securing an end of the compression spring at the end portion of the armature;

a bridging conductor disc carried by the insulating washer;

a pair of electrical contacts disposed in the housing for being electrically closed when the relay solenoid is actuated and opened when the relay armature is released for movement away from therelay solenoid;

a latching armature disposed above the relay having a major axis substantially parallel to the axis of the solenoid;

means pivotally mounting the latching armature adjacent the back wall of the housing;

a finger secured to the latching armature extending downwardly therefrom substantially perpendicular to the major axis of the latching armature for engaging the indent in the relay armature to fix the position of the relay armature in the position thereof whereat the electrical contacts are closed by the bridging conductor disc;

an extension on the latching relay extending in the direction of the major axis of the latching armature toward the front wall of the housing;

an insulating pin slidably received in an aperture in the front wall of the housing and extending therethrough disposed under and adjacent the front end of the latching relay extension for lifting the extension and the finger of the latching relay to release the relay armature when the pin is pushed inwardly of the housing, said pin having an enlarged portion adjacent the inner end thereof tapering to a pointed inner end for slidably engaging the extension end to bias the pin outwardly of the housing;

a latching solenoid mounted in the housing above the latching armature for attracting the armature in an upward pivoted movement to release the relay armature when the latching solenoid is energized, said latching solenoid being disposed above the relay armature and having its axis substantially perpendicular to the axis of the relay solenoid;

a compression spring between the latching solenoid and the latching armature constantly biasing the latching armature for movement downwardly in the direction of said indent;

a microswitch disposed in the housing above the extension of the latching armature, said microswitch having an input and two output terminals;

a switch operator positioned for engagement by the extension when the latching armature is pivoted upwardly; and circuit means in the housing completing a path from the switch input terminal through one output terminal to the latching solenoid when the latching armature is in the downward position with the finger thereon engaging the relay armature and from the switch input terminal through the other switch output terminal to the relay solenoid when the latching solenoid is in its upward position releasing the relay armature for movement.

2. The safety switch of claim 1 wherein:
the housing enclosure has bottom, back and front walls;
the relay solenoid is secured in the housing enclosure adjacent the bottom and back walls; and
the manual reset means is slidably received in an aperture in the front wall of the housing enclosure.

3. The safety switch of claim 1 wherein the manual reset means is a pin extending through the housing enclosure wall.

4. The safety switch of claim 3 wherein the manual reset pin further comprises;
an enlargement on the inner end portion tapering to form a point at the end of the pin.

5. The safety switch of claim 4 wherein the tapered end portion of the manual reset pin slidably engages the latching armature for biasing the manual reset pin outwardly of the housing enclosure.

6. The safety switch of claim 1 wherein:
the latching relay further includes an extension in the direction of the latching relay axis, said extension including a partially turned up end;
the manual reset means is a pin and wherein the pin further comprises an enlargement on the inner end thereof tapering to a pointed inner end; and wherein the tapered inner end of the pin slidably engages the partially turned up end of the latching relay extension for slidably biasing the pin outwardly of the housing enclosure.

7. The safety switch of claim 6 wherein:
the housing enclosure includes bottom, back and front walls, said front wall having at least one aperture therein;
the relay solenoid is mounted adjacent the back and bottom sides with its axis substantially parallel to the bottom side; and
the manual reset pin extends through an aperture in the housing enclosure.

8. The safety switch of claim 7 wherein the housing enclosure is composed of an insulating material.

9. The safety switch of claim 6 wherein the pin is composed of a self-lubricating insulating material.

References Cited

UNITED STATES PATENTS

| | | | |
|---|---|---|---|
| 1,522,208 | 1/1925 | Rukstelis | 335—173 |
| 2,680,172 | 6/1954 | Moyer | 200—116 |
| 3,171,919 | 3/1965 | Hammerly | 200—116 |
| 3,229,109 | 1/1966 | Wilson | 335—170 |

BERNARD A. GILHEANY, *Primary Examiner.*

H. BROOME, *Assistant Examiner.*